US008398225B2

(12) United States Patent
Ichimura et al.

(10) Patent No.: US 8,398,225 B2
(45) Date of Patent: Mar. 19, 2013

(54) IMAGE FORMING APPARATUS, AND APPARATUS AND METHOD FOR APPLYING FOAMED LIQUID

(75) Inventors: Minori Ichimura, Tokyo (JP); Kazuyoshi Matsumoto, Tokyo (JP); Manabu Izumikawa, Tokyo (JP); Takeshi Takemoto, Kanagawa (JP); Yasuhisa Kato, Kanagawa (JP); Yasuo Katano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 340 days.

(21) Appl. No.: 12/377,014

(22) PCT Filed: Jul. 4, 2008

(86) PCT No.: PCT/JP2008/062527

§ 371 (c)(1),
(2), (4) Date: Feb. 10, 2009

(87) PCT Pub. No.: WO2009/008490

PCT Pub. Date: Jan. 15, 2009

(65) Prior Publication Data

US 2010/0165016 A1 Jul. 1, 2010

(30) Foreign Application Priority Data

Jul. 6, 2007 (JP) ................................ 2007-178698

(51) Int. Cl.

| | |
|---|---|
| ***B41J 2/01*** | (2006.01) |
| ***B41J 2/17*** | (2006.01) |
| ***B41J 2/015*** | (2006.01) |
| *B29C 65/00* | (2006.01) |
| *B32B 3/00* | (2006.01) |
| *B32B 5/00* | (2006.01) |
| *B32B 5/18* | (2006.01) |
| *B32B 37/00* | (2006.01) |

(52) U.S. Cl. ............ 347/101; 347/103; 347/95; 347/21; 156/78; 156/79

(58) Field of Classification Search .................. 347/101; 156/78, 79

See application file for complete search history.

(56) References Cited

U.S. PATENT DOCUMENTS 4,158,076 A * 6/1979 Wallsten ........................ 427/294
4,444,104 A * 4/1984 Mitter ............................ 101/119

(Continued)

FOREIGN PATENT DOCUMENTS

EP 0663300 A1 7/1995
JP 56-89595 7/1981

(Continued)

OTHER PUBLICATIONS

Sep. 27, 2011 Japanese official action in connection with a counterpart Japanese patent application.

(Continued)

*Primary Examiner* — Laura Martin
*Assistant Examiner* — Jeremy Bishop
(74) *Attorney, Agent, or Firm* — Cooper & Dunham LLP

(57) ABSTRACT

A foamed liquid coating apparatus prevents curling or warping of a sheet caused by coating irregularities when coated with a preprocessing solution using a coating roller or a liquid discharge head. The foamed liquid coating apparatus includes a container holding a liquid that can be foamed. A first foamed liquid producing/transporting unit produces a foamed liquid having a foam size greater than a required foam size from the liquid supplied from the container. A second foamed liquid producing/transporting unit produces a foamed liquid having the required foam size from the foamed liquid produced by the first foamed liquid producing/transporting unit. The foamed liquid produced by the second foamed liquid producing/transporting unit is applied onto a first coating roller. The foamed liquid is further supplied from the first coating roller to a second coating roller that coats a sheet with the foamed liquid.

16 Claims, 14 Drawing Sheets

U.S. PATENT DOCUMENTS

| | | | | |
|---|---|---|---|---|
| 5,771,054 | A | 6/1998 | Dudek et al. | |
| 5,845,993 | A * | 12/1998 | Shirtum et al. | 366/348 |
| 6,183,079 | B1 | 2/2001 | Meade et al. | |
| 6,234,625 | B1 * | 5/2001 | Wen | 347/101 |
| 6,494,569 | B2 * | 12/2002 | Koitabashi et al. | 347/98 |
| 7,046,952 | B2 * | 5/2006 | Kurotori et al. | 399/340 |
| 7,083,693 | B2 * | 8/2006 | Chen et al. | 156/79 |
| 7,869,754 | B2 * | 1/2011 | Katano et al. | 399/340 |
| 2006/0115762 | A1 | 6/2006 | Katano et al. | |
| 2006/0263712 | A1 | 11/2006 | Katano et al. | |
| 2006/0284951 | A1 * | 12/2006 | Ikeda et al. | 347/103 |
| 2007/0147913 | A1 | 6/2007 | Katano et al. | |
| 2007/0176995 | A1 * | 8/2007 | Kadomatsu et al. | 347/103 |
| 2007/0243483 | A1 * | 10/2007 | Katano et al. | 430/124.21 |
| 2008/0063446 | A1 | 3/2008 | Katano et al. | |
| 2008/0069612 | A1 | 3/2008 | Nakamura et al. | |
| 2009/0003903 | A1 * | 1/2009 | Katano et al. | 399/340 |

FOREIGN PATENT DOCUMENTS

| | | | |
|---|---|---|---|
| JP | 2-26678 | | 1/1990 |
| JP | 07241983 | A * | 9/1995 |
| JP | 7-266031 | | 10/1995 |
| JP | 8-323997 | | 12/1996 |
| JP | 9-103734 | | 4/1997 |
| JP | 2001-334642 | | 12/2001 |
| JP | 2001-353861 | | 12/2001 |
| JP | 2002-96452 | | 4/2002 |
| JP | 2002-96453 | | 4/2002 |
| JP | 2002-96454 | | 4/2002 |
| JP | 2002-103583 | | 4/2002 |
| JP | 2002-137378 | | 5/2002 |
| JP | 2003-11486 | | 1/2003 |
| JP | 2003-103924 | | 4/2003 |
| JP | 2003-246135 | | 9/2003 |
| JP | 2005-138502 | | 6/2005 |
| JP | 2004-330569 | | 11/2005 |
| JP | 2006-45521 | | 2/2006 |
| JP | 2006-45522 | | 2/2006 |
| JP | 2006-192671 | | 7/2006 |
| WO | WO2005/075210 | A1 | 8/2005 |
| WO | WO 2007094245 | A1 * | 8/2007 |

OTHER PUBLICATIONS

Apr. 10, 2012 European official action in connection with counterpart European patent application No. 08 778 048.2.

* cited by examiner

IMAGE FORMING APPARATUS, AND APPARATUS AND METHOD FOR APPLYING FOAMED LIQUID

TECHNICAL FIELD

The present invention generally relates to image forming apparatuses, and apparatuses and methods for applying a foamed liquid.

BACKGROUND ART

In a known type of image forming apparatuses, which include printers, facsimile machines, copiers, and multifunction peripherals, image formation (which may involve recording, printing, transfer, etc.) is performed by discharging droplets of a recording fluid onto a medium (such as a sheet of paper or any other material, a recording medium, transfer material, a recording paper, etc.) using a liquid-discharging recording head while the medium is transported.

As used herein the term "image forming apparatus" is intended to refer to an apparatus that performs image formation by discharging droplets of a recording fluid onto a medium, which may be made of various materials, such as paper, threads, fibers, fabrics, leather, metals, plastics, glass, wood, and ceramics. As used herein the term "image formation" is intended to refer not just to the transfer of an image with some meaning, such as letters or a figure, to a medium, but also to the imparting of an image without any meaning, such as a random pattern, to the medium. As used herein the term "recording fluid" is intended to refer not just to ink but also any fluid that can be discharged in the form of droplets to perform image formation in the above sense.

In such a liquid-discharge type image forming apparatus, when image formation is performed by forming droplets of a recording fluid (to be hereafter referred to as an "ink") including a colorant, problems known as feathering or color breeding may occur. The feathering is the blurring of an ink dot on the medium. The color breeding is the blurring of the boundary of different colors when ink droplets of different colors are sprayed onto the sheet adjacent to one another. Another problem associated with this type of an image forming apparatus is that a droplet placed on the sheet needs time to dry.

Japanese Laid-Open Patent Application No. 8-323977 discloses that a heating unit is used before or after printing to prevent blurring and promote the drying of sprayed ink.

Japanese Laid-Open Patent Application No. 2002-137378 discloses that a preprocessing fluid that reacts with ink to prevent blurring is applied to the sheet with a coating roller. Japanese Laid-Open Patent Application No. 2005-138502 discloses that a preprocessing fluid is sprayed out of a liquid discharge head in the form of mist to coat the sheet.

However, the use of a heating unit leads to an increase in power consumption. The coating of the sheet with a preprocessing fluid using a coating roller or a liquid discharge head may produce coating irregularities. The coating technology also has the problem of the extended time required for the fluid to dry after reacting with the ink on the sheet. The sheet may also curl or warp after the coating, resulting in the increased likelihood of jamming.

SUMMARY

In an aspect of this disclosure, there is provided an image forming apparatus, and an apparatus and method for applying a foamed liquid whereby coating irregularities are reduced and an enhanced fast-drying property of an applied liquid is achieved.

In another aspect, there is provided an image forming apparatus comprising a recording head configured to discharge a droplet of a fluid onto a recording medium in order to form an image thereon, and a foamed liquid coating unit configured to apply a foamed liquid onto the recording medium.

In one aspect, the invention provides an image forming apparatus comprising a recording head configured to discharge a droplet of a fluid onto a recording medium in order to form an image thereon; and a foamed liquid coating unit configured to apply a foamed liquid onto the recording medium.

In a preferred embodiment, the fluid is a recording fluid having a colorant, and the recording fluid reacts with the foamed liquid.

In another preferred embodiment, the foamed liquid coating unit includes a container for holding a liquid that can be foamed; a first foam producing unit configured to produce a foamed liquid having a foam size greater than a required foam size from the liquid supplied from the container; a second foam producing unit configured to produce a foamed liquid having the required foam size from the foamed liquid produced by the first foam producing unit; and a coater unit configured to apply the foamed liquid produced by the second foam producing unit onto the recording medium.

The image forming apparatus may include a recovery unit configured to recover the foamed liquid that need not be fed to the coater unit. The image forming apparatus may further include a circulating unit configured to circulate the recovered foamed liquid back into the first foam producing unit. The image forming apparatus may include a first open/close unit disposed between the first foam producing unit and the second foam producing unit and configured to allow or block the movement of the foamed liquid. The image forming apparatus may further include a second open/close unit disposed between the second foam producing unit and the coater unit and configured to allow or block the movement of the foamed liquid. The second open/close unit may be capable of varying the area of passage of the foamed liquid.

The image forming apparatus may include a warming unit configured to warm the container. The image forming apparatus may include a heating unit configured to heat the foamed liquid in the first foam producing unit and the second foam producing unit. The heating unit may be controlled on the basis of a result of detection of an ambient condition. The image forming apparatus may further include a film thickness setting unit configured to adjust a film thickness of the applied foamed liquid.

In another aspect, there is provided an apparatus for applying a foamed liquid onto a material, wherein the apparatus comprises a container for holding a liquid that can be foamed; a first foam producing unit configured to produce a foamed liquid having a foam size greater than a required foam size from the liquid supplied from the container; a second foam producing unit configured to produce a foamed liquid having the required foam size from the foamed liquid produced by the first foam producing unit; and a coater unit configured to apply the foamed liquid produced by the second foam producing unit onto the material.

In yet another aspect, there is provided a method of applying a foamed liquid onto a material, wherein the method comprises a first foam producing step of producing a foamed liquid having a foam size greater than a required foam size from a liquid that can be foamed; a second foam producing step of producing a foamed liquid having the required foam size from the foamed liquid produced in the first foam producing step; and a coating step of applying the foamed liquid produced in the second foam producing step onto the material.

In accordance with the image forming apparatus according to an embodiment, a foamed liquid is applied to a recording medium using a foamed liquid coating unit. Thus, a uniform coating and a fast-drying property can be obtained.

In accordance with an apparatus and method for applying a foamed liquid to a material according to an embodiment, a foamed liquid having a foam size greater than a required foam size is produced from a liquid that can be foamed, and then a foamed liquid having the required foam size is produced, followed by the application of the foamed liquid onto the material. Thus, a foamed liquid can be efficiently produced and applied, and a uniform coating and a fast-drying property can be obtained.

BEST MODE OF CARRYING OUT THE INVENTION

Figure 1:
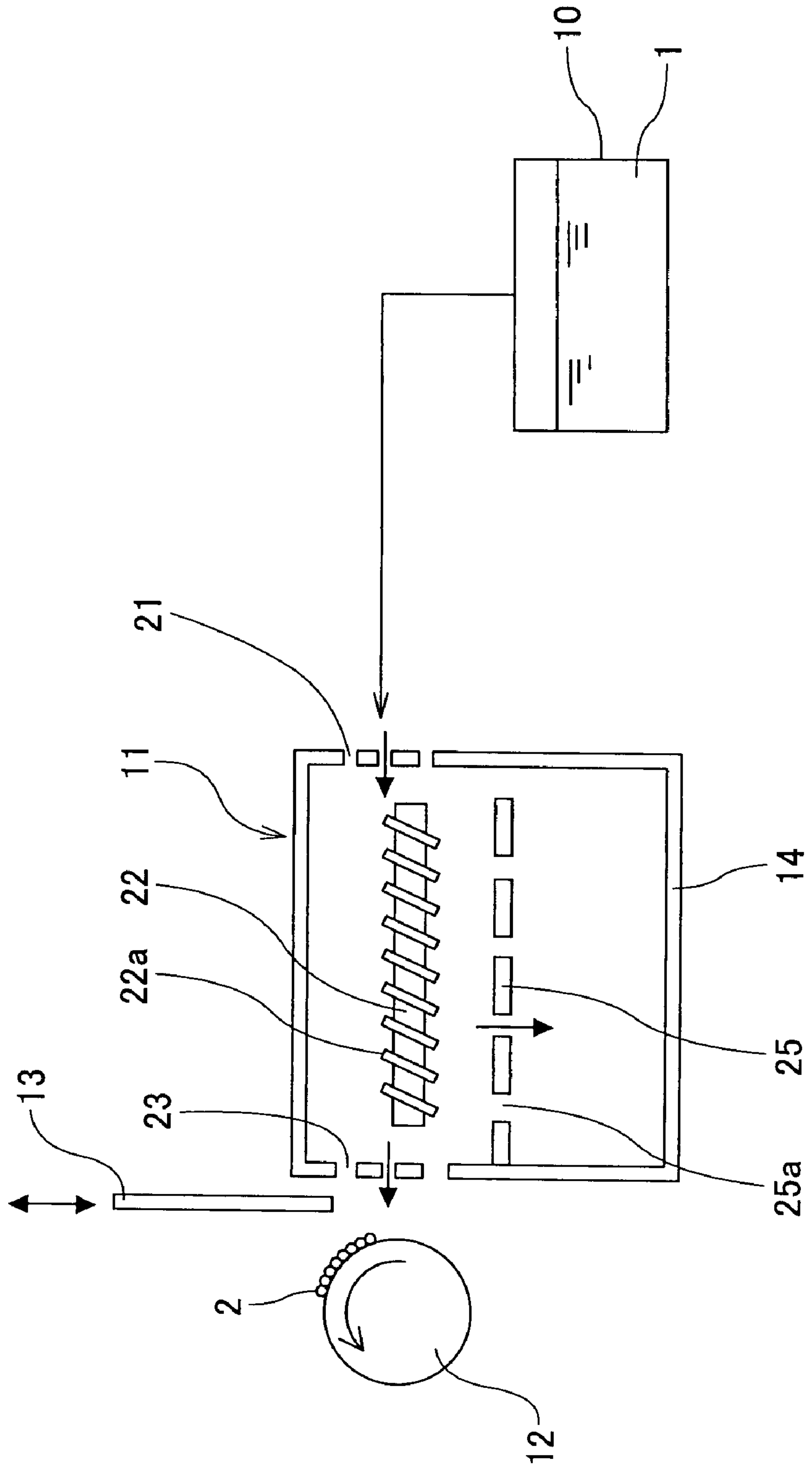
FIG. 1 shows a schematic diagram of an apparatus for coating a medium with a foamed liquid according to an embodiment of the present invention.

In the following, embodiments of the present invention are described with reference to the attached drawings. Initially, an apparatus for coating a material with a foamed liquid (to be hereafter referred to as a "foamed liquid coating apparatus") and a coating method according to an embodiment of the invention are described with reference to FIG. 1. FIG. 1 schematically shows the foamed liquid coating apparatus.

The foamed liquid coating apparatus includes a container 10 for holding a liquid 1 that can be foamed. The liquid 1 is supplied from the container 10 to a foamed liquid producing/transporting unit 11, which is a foamed liquid producing unit that turns the liquid 1 into a foamed liquid having a required foam size while transporting the liquid 1. The foamed liquid is supplied from the foamed liquid producing/transporting unit 11 to a coating roller 12 that is a coater unit for applying the foamed liquid to a medium. The amount of the foamed liquid delivered from the foamed liquid producing/transporting unit 11 to the coating roller 12 is controlled by an open/close unit 13 that allows or blocks (i.e., opens or closes) the passage of the foamed liquid. Excess foamed liquid that is not applied to the coating roller 12 is collected by a foamed liquid recovery unit 14. The open/close unit 13 may be a part of the foamed liquid producing/transporting unit 11.

In the foamed liquid producing/transporting unit 11, initially a foamed liquid with a foam size much larger than a required foam size is formed as the liquid 1 passes through a meshed inlet 21. The foamed liquid producing/transporting unit 11 houses one or more stirring/transport members 22 having screw-shaped stirring vanes 22*a*, as shown in FIG. 1. As the stirring/transport member 22 rotates, the foamed liquid is stirred and impregnated with gas while a shearing force is applied to the liquid, thereby producing a foamed liquid with a required smaller foam size. Simultaneously the foamed liquid is transported toward the coating roller 12, and the foam size is further reduced as the foamed liquid passes through a coating outlet 23 that is composed of a meshed member. A resultant foamed liquid 2 with the required size is supplied to the circumferential surface of the coating roller 12.

As the coating roller 12 rotates in the direction of the arrow, the foamed liquid 2 on its circumferential surface is transported and applied onto the surface of the material to be coated, which is not shown. Instead of transferring the foamed liquid directly to the coating roller 12, one or more intermediate transfer rollers may be disposed between the coating roller 12 and the coating outlet 23, so that the foamed liquid is once transferred to the intermediate transfer roller from the coating outlet 23 and then onto the coating roller 12.

The open/close unit 13 is disposed so that it can move up and down in the direction of the arrows to open or close the coating outlet 23 of the foamed liquid producing/transporting unit 11. The open/close unit 13 moves up to open the coating outlet 23 only when applying (supplying) the foamed liquid 2 to the coating roller 12.

The recovery unit 14 includes a partition member 25 having plural openings 25*a* and forming a bottom surface of the foamed liquid producing/transporting unit 11. The foamed liquid 2 that is produced after the open/close unit 13 has closed and that remains unapplied to the coating roller 12 drops through the plural openings 25*a* and is collected in the recovery unit 14 as excess foamed liquid.

By thus coating the material with the foamed coating liquid, a coating with a uniform thickness can be obtained and fast-drying property can be obtained.

In accordance with the foregoing embodiment, because the foamed liquid with a required foam size is produced from a liquid simultaneously as the liquid is transported to the coater unit, the foamed liquid can be applied to the material very efficiently. The recovery unit for collecting the excess foamed liquid that remains unused ensures that the medium can be coated with new and fine foamed liquid at all times.

Figure 3:
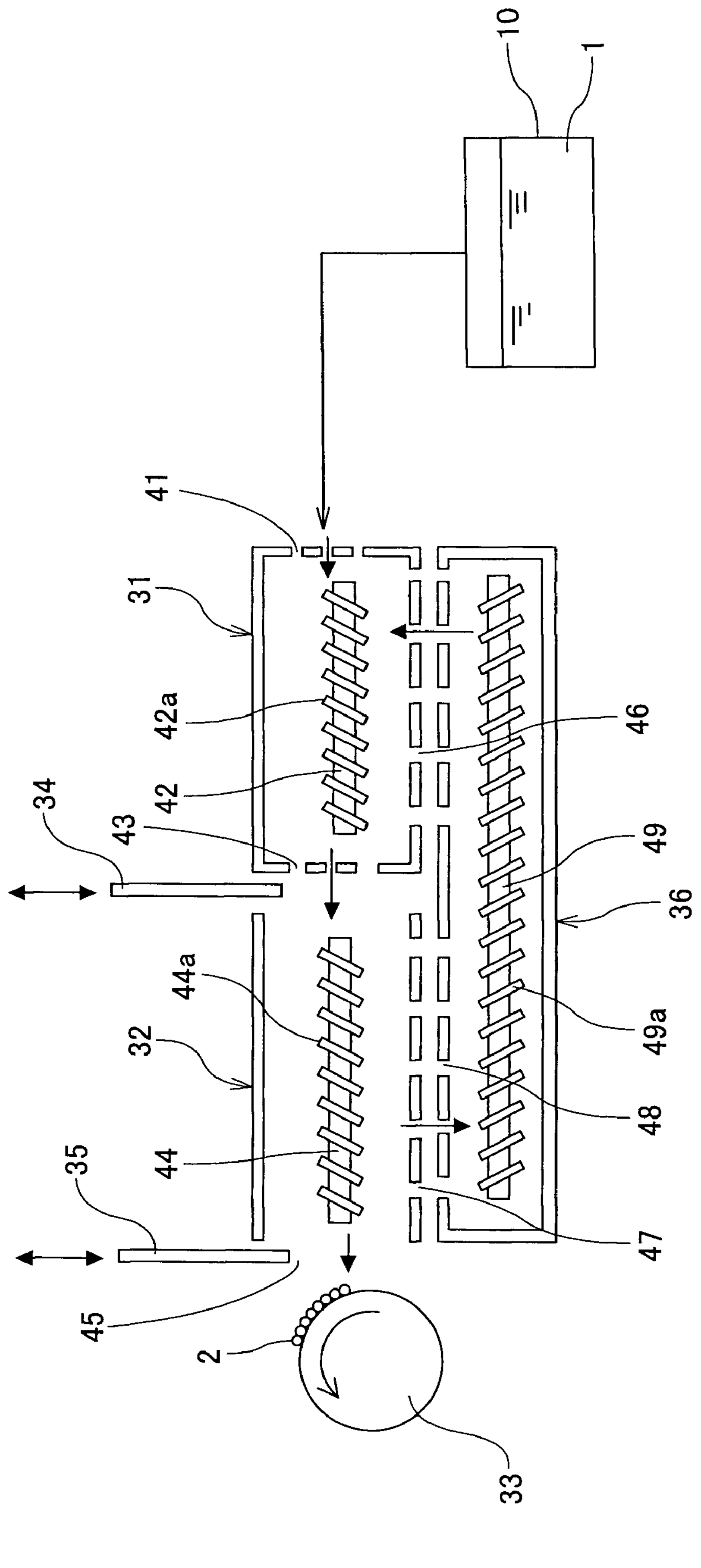
FIG. 3 shows a schematic diagram of an apparatus for coating a medium with a foamed liquid according to another embodiment of the invention.

In the following, a foamed liquid coating apparatus and a coating method according to another embodiment of the invention is described with reference to FIG. 3. FIG. 3 schematically shows the foamed liquid coating apparatus.

The foamed liquid coating apparatus includes a container 10 for holding a liquid 1 that can be foamed. The liquid 1 is supplied from the container 10 to a first foamed liquid producing/transporting unit 31, which is a first foamed liquid producing unit configured to produce a foamed liquid with a foam size larger than a required foam size. The foamed liquid produced by the first foamed liquid producing/transporting unit 31 is fed to a second foamed liquid producing/transporting unit 32, which is a second foamed liquid producing unit configured to produce a foamed liquid with the required foam size. The foamed liquid produced by the second foamed liquid producing/transporting unit 32 is delivered to a coating roller 33 that is a coater unit for coating a medium. The movement of the foamed liquid from the first foamed liquid producing/transporting unit 31 to the second foamed liquid producing/transporting unit 32 is allowed or blocked by a first open/close unit 34. The movement of the foamed liquid from the second foamed liquid producing/transporting unit 32 to the coating roller 33 is allowed or blocked by a second open/close unit 35. Excess foamed liquid produced in the first foamed liquid producing/transporting unit 31 is recovered by a recovery/circulating unit 36. The recovery/circulating unit 36 also recovers excess foamed liquid produced in the second foamed liquid producing/transporting unit 32 that remains undelivered to the coating roller 33, and circulates the excess foamed liquid back to the first foamed liquid generating unit 31.

Figure 2:
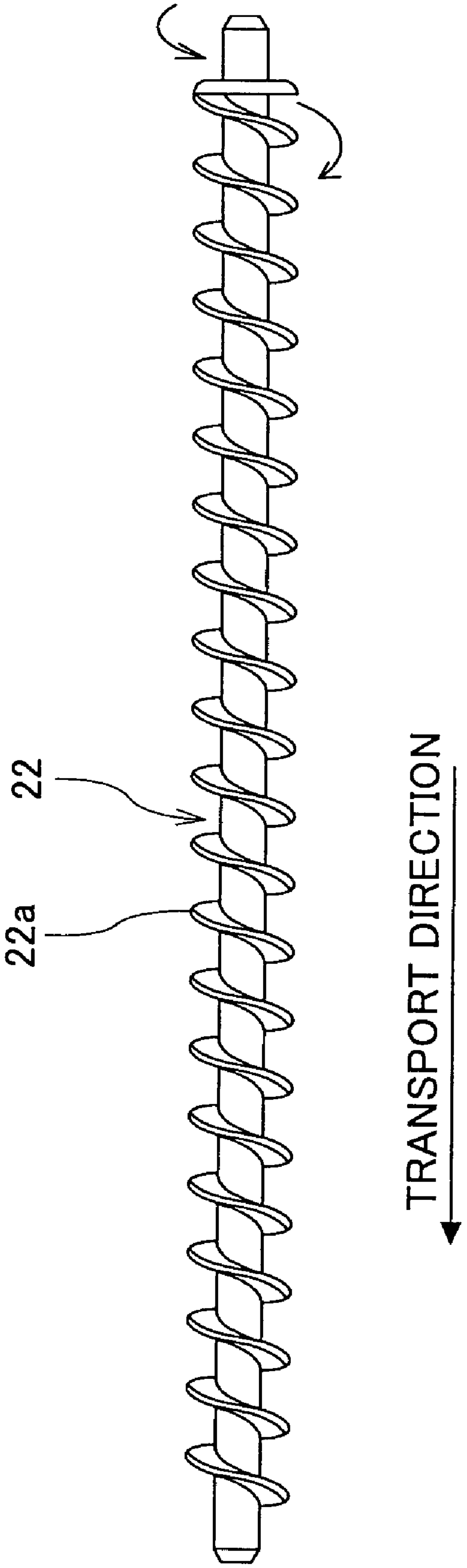
FIG. 2 shows a stirring/transport member in the apparatus of FIG. 1.

The first foamed liquid producing/transporting unit 31, as is the foamed liquid producing/transporting unit 11 according to the foregoing embodiment, is fed with the liquid 1 via a meshed inlet 41 from the container 10 and produces a foamed liquid with a foam size larger than a required foam size. The foamed liquid producing/transporting unit 31 includes one or more stirring/transport members 42 of a similar construction as the stirring/transport member 22 that has been described with reference to FIG. 2. Namely, the stirring/transport member 42 has screw-shaped stirring vanes 42*a*. As the stirring/transport member 42 rotates, the foamed liquid is stirred and mixed in with gas, while a shearing force is applied to obtain a foamed liquid with a reduced foam size. The foamed liquid is then transported toward the second foamed liquid producing/transporting unit 32, and a foamed liquid with a further reduced foam size is produced as the foamed liquid passes through a feed opening 43 composed of a meshed member.

The second foamed liquid producing/transporting unit 32 produces a foamed liquid with the required foam size from the foamed liquid delivered from the first foamed liquid producing/transporting unit 31. The second foamed liquid producing/transporting unit 32 includes one or more stirring/transport members 44 having screw-shaped stirring vanes 44*a*, similar to the stirring/transport member 22 described with reference to FIG. 2. As the stirring/transport member 44 rotates, the foamed liquid is stirred and mixed in with gas while a shearing force is applied, thereby forming a foamed liquid 2 with the required foam size. The foamed liquid 2 is then supplied to the coating roller 33 via a coating outlet 45.

The foamed liquid 2 exits the second foamed liquid producing/transporting unit 32 via the coating outlet 45 and is then transferred onto the circumferential surface of the coating roller 33. As the coating roller 33 rotates in the direction of the arrow, the foamed liquid 2 is also transported and applied to the surface of a medium to be coated, which is not shown. Instead of transferring the foamed liquid to the coating roller 33 directly, one or more intermediate transfer rollers may be disposed between the coating roller 33 and the coating outlet 45, so that the foamed liquid can be once transferred to the intermediate transfer roller and then further onto the coating roller 33 via the intermediate transfer roller.

The first open/close unit 34 is disposed so that it can be moved up and down to open or close the feed opening 43 of the first foamed liquid producing/transporting unit 31. In this way, the first open/close unit 34 prevents the mixing of the foamed liquid produced by the first foamed liquid producing/transporting unit 31 and the foamed liquid produced by the second foamed liquid producing/transporting unit 32.

The second open/close unit 35 is disposed so that it can be moved up and down to open or close the coating outlet 45 of the second foamed liquid producing/transporting unit 32. The second open/close unit 35 moves up to open the coating outlet 45 only when applying (supplying) the foamed liquid onto the coating roller 33.

The first open/close unit 34 may be constructed as part of either the first foamed liquid producing/transporting unit 31 or the second foamed liquid producing/transporting unit 32. The second open/close unit 35 may be constructed as part of the second foamed liquid producing/transporting unit 32.

The recovery/circulating unit 36 has a top surface in which plural openings 48 are formed. These openings are individually in communication with plural openings 46 in a bottom surface of the first foamed liquid producing/transporting unit 31, and plural openings 47 in a bottom surface of the second foamed liquid producing/transporting unit 32. Within the recovery/circulating unit 36, there is disposed one or more stirring/transport members 49 with a similar construction as the stirring/transport member 22 described above with reference to FIG. 2; namely, the stirring/transport member has screw-shaped stirring vanes 49*a*. The recovery/circulating unit 36 is configured to collect, via the plural openings 47 and 48, the foamed liquid 2 produced by the second foamed liquid producing/transporting unit 32 but not delivered to the coating roller 33. The thus collected foamed liquid 2 is transported by the stirring/transport member 49 toward the first foamed liquid producing/transporting unit 21. The foamed liquid successively collects below the first foamed liquid producing/transporting unit 31 and its volume swells. As a result, the swelled foamed liquid is pushed back into the first foamed liquid producing/transporting unit 31 via the plural openings 48 and 46, where the foamed liquid is stirred again.

When the plane of the recovery/circulating unit 36 that is in contact with the second foamed liquid producing/transporting unit 32 is inclined, the foamed liquid may be circulated more smoothly. There can also be provided a mechanism (or unit) to push the foamed liquid that collects in the recovery/circulating unit 36 up toward the first foamed liquid producing/transporting unit 31.

In this way, a foamed liquid with a foam size larger than a required foam size is produced from a liquid that can be foamed, and then the foamed liquid is turned into a foamed liquid with the required foam size, with which the medium to be coated is coated. Thus, the required foamed liquid can be produced and applied efficiently, and enhanced coating uniformity and fast-drying property can be obtained.

Figure 4:
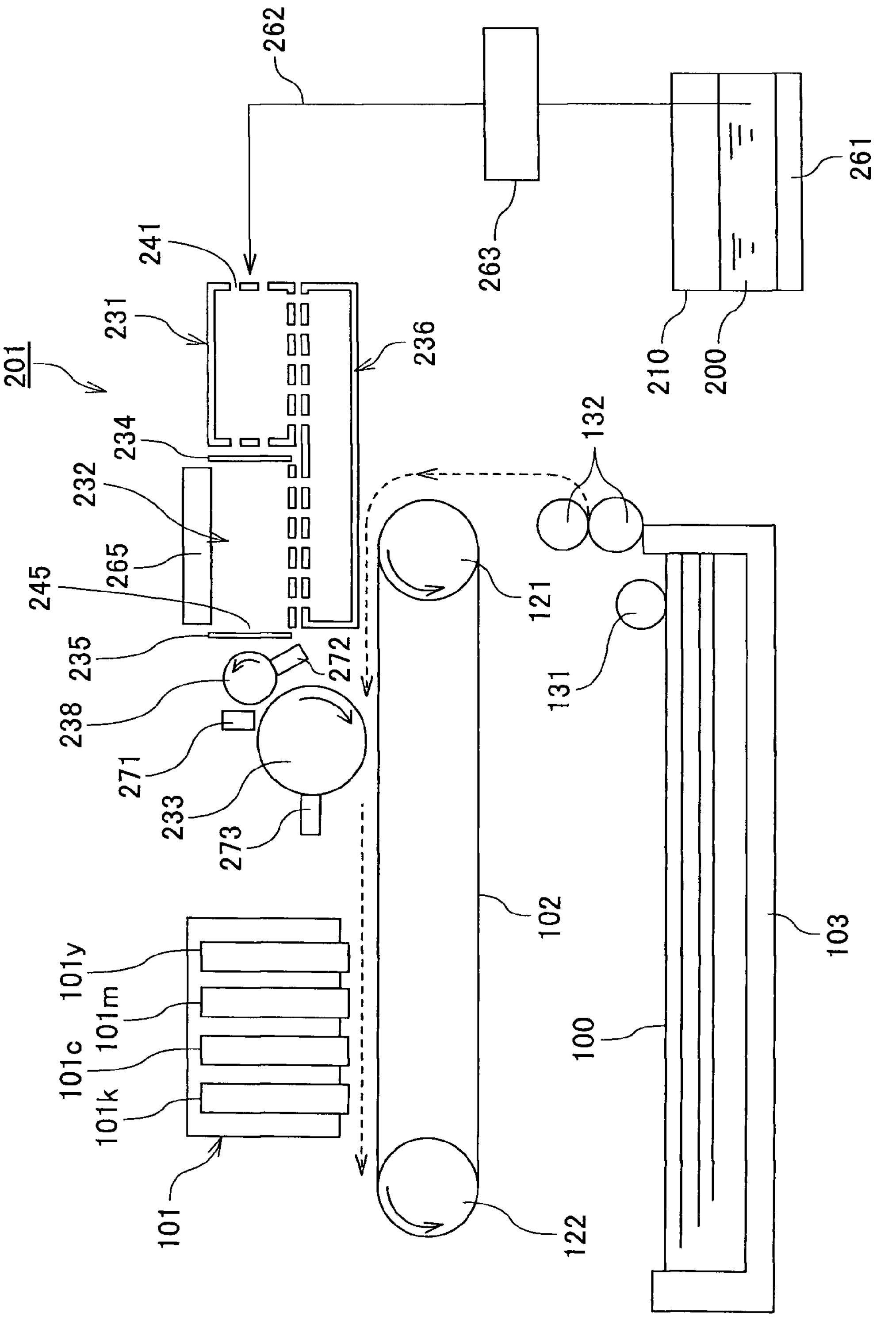
FIG. 4 shows a schematic diagram of an image forming apparatus according to an embodiment of the present invention.

In the following, an image forming apparatus according to an embodiment of the invention is described with reference to FIG. 4. FIG. 4 shows a schematic diagram of the image forming apparatus.

The image forming apparatus includes a recording head unit 101 configured to discharge a droplet of ink onto a sheet 100, which is a recording medium, to form an image thereon. The sheet 100 is transported by a transport belt 102 from a paper feed tray 103. The sheet 100 is coated with a foamed liquid by a foamed liquid coating apparatus 201 according to an embodiment of the invention in an area upstream of the recording head unit 101 along the direction of transport of the sheet 100.

The recording head unit 101, which is a line-type liquid discharge head, has a line of nozzles for discharging droplets extending over a distance corresponding to the width of the sheet 100.

Specifically, the recording head unit 101 includes recording heads 101*y*, 101*m*, 101*c*, and 101*k* for discharging ink droplets of the colors yellow (Y), magenta (M), cyan (C), and black (K), respectively. In another embodiment, the recording head may be mounted on a carriage in a serial-type image forming apparatus.

The transport belt 102 is an endless belt extended between a transport roller 121 and a tension roller 122 for rotation. The sheet 100 may be retained on the transport belt 102 by a variety of technologies, such as electrostatic adsorption or air suction.

The sheet 100 placed in the paper feed tray 103 is picked up by the pickup roller 131 one by one. The sheet 100 is then fed by a pair of transport rollers 132 along a transport path onto the transport belt 102, as indicated by the broken line, where the sheet 100 is electrostatically adsorbed.

The foamed liquid coating apparatus 201 includes a container 210 in which a liquid 200 that can be foamed is contained. The liquid 200 is supplied from the container 210 to a first foamed liquid producing/transporting unit 231 for producing a foamed liquid with a foam size larger than a required foam size. The foamed liquid produced by the first foamed liquid producing/transporting unit 231 is supplied to a second foamed liquid producing/transporting unit 232 for producing a foamed liquid with the required foam size. The foamed liquid produced by the second foamed liquid producing/transporting unit 232 is then applied to a first coating roller 238, which is an intermediate transfer roller. The foamed liquid is further delivered from the first coating roller 238 to a second coating roller 233 for coating the sheet 100 with the foamed liquid. The movement of the foamed liquid from the first foamed liquid producing/transporting unit 231 to the second foamed liquid producing/transporting unit 232 is allowed or blocked by a first open/close unit 234. The movement of the foamed liquid from the second foamed liquid producing/transporting unit 232 to the first coating roller 238 is allowed or blocked by a second open/close unit 235. Excess foamed liquid produced by the first foamed liquid producing/transporting unit 231 is collected by a recovery/circulating unit 236. The recovery/circulating unit 236 also collects excess foamed liquid produced by the second foamed liquid producing/transporting unit 232 but not fed to the first coating roller 238, and circulates it back to the first foamed liquid generating unit 231.

The liquid 200 that can be foamed is a modifier that is applied to the surface of the sheet 100 to modify the surface. The liquid 200 may be a fixing agent which, when applied to the sheet 100 (the material of which is not limited to paper, as mentioned above) uniformly, facilitates the permeation of the moisture of ink into the sheet 100, thickens color components, and quickens drying, thereby preventing the blurring (such as feathering or color breeding) and strike-through, and enhancing productivity (i.e., the number of sheets output per unit time).

The liquid 200 may be composed of a solution of a surfactant (anionic, cationic, or nonionic surfactant, or a mixture of two or more thereof) to which a cellulose (such as hydroxypropylcellulose) that promotes the permeation of moisture, and a base such as fine powder of talc are added. The liquid 200 may further include fine particles.

The container 210 for holding the liquid 200 that can be foamed is equipped with a warming unit 261 for maintaining the foamable liquid 200 at a certain temperature regardless of the ambient conditions. The liquid 200 contained in the container 210 is supplied to the first foamed liquid producing/transporting unit 231 by a pump 263 disposed in a passage 262.

The first and the second foamed liquid generating units 231 and 232 are similar to the first and the second foamed liquid producing/transporting units 31 and 32 of the foregoing embodiment, respectively. Thus, after the first foamed liquid producing/transporting unit 231 receives the liquid 200 via the inlet 241, the liquid 200 is stirred and transported by a stirring/transport member, not shown in FIG. 4, as it is rotated. The transfer and stirring are repeated, whereby a foamed liquid with a required foam size is obtained via the outlet 245 of the second foamed liquid producing/transporting unit 232. The foamed liquid is then fed to the first coating roller 238.

The second foamed liquid producing/transporting unit 232 is equipped with a first heating unit 265 for maintaining the produced foamed liquid at a certain temperature regardless of the ambient conditions. The first heating unit 265 may be configured to turn on simultaneously with the turning on of the apparatus to start heating. Alternatively, the first heating unit 265 may be configured to turn on at a predetermined time to start heating so that power consumption can be minimized.

The first open/close unit 234 is disposed between the first foamed liquid producing/transporting unit 231 and the second foamed liquid producing/transporting unit 232. It either allows or blocks the movement of the foamed liquid from the first foamed liquid producing/transporting unit 231 to the second foamed liquid producing/transporting unit 232, in order to prevent the mixing of the foamed liquids produced by the first and the second foamed liquid producing/transporting units 231 and 232.

The second open/close unit 235 is disposed between the second foamed liquid producing/transporting unit 232 and the first coating roller 238. It either allows or blocks the movement of the foamed liquid from the second foamed liquid producing/transporting unit 232 to the coater unit. Specifically, the second open/close unit 235 opens or closes the outlet 245 of the second foamed liquid producing/transporting unit 232, in order to control the amount of foamed liquid applied (supplied) to the first coating roller 238. In this way, the foamed liquid can be transferred to the coater unit efficiently.

Figure 5:
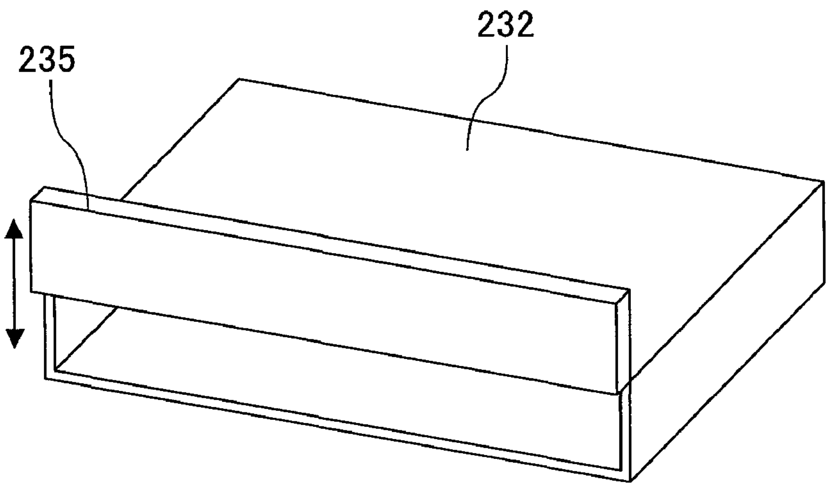
FIG. 5 shows a perspective view of an example of a second open/close unit.
Figure 6:
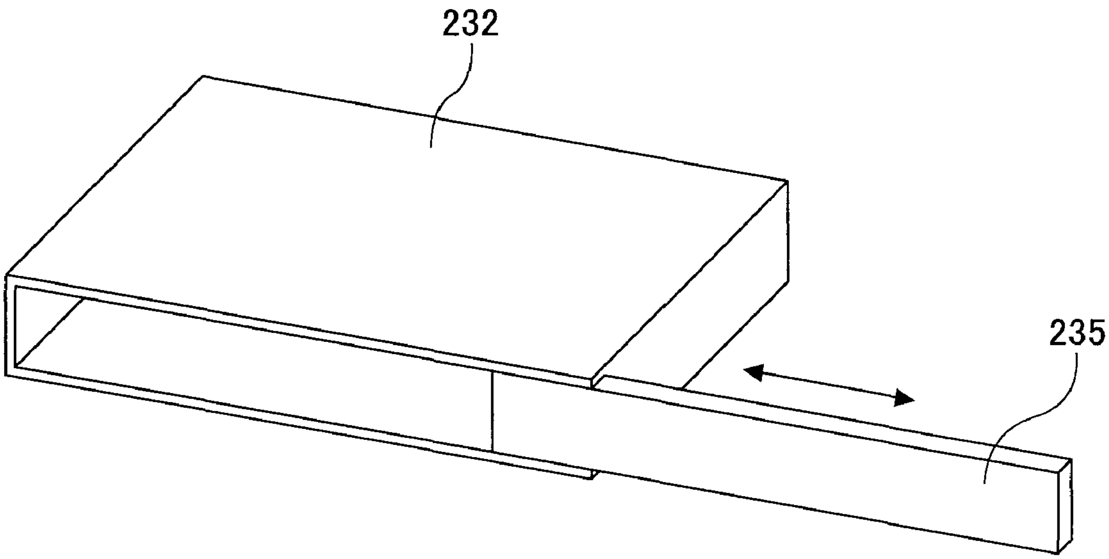
FIG. 6 shows a perspective view of another example of the second open/close unit.

The second open/close unit 235 may be configured to move up and down, as shown in FIG. 5, to open or close the outlet 245 of the second foamed liquid producing/transporting unit 232. Alternatively, as shown in FIG. 6, the second open/close unit 235 may be configured to move laterally (i.e., in the width direction of the sheet) to open or close the outlet 245 of the second foamed liquid producing/transporting unit 232.

In the configuration shown in FIG. 5, the coated area on the coating roller 238 can be adjusted in the circumferential direction thereof. Thus, the coated area on the sheet 100 in the transport direction can be controlled. On the other hand, in the configuration shown in FIG. 6, the coated area on the coating roller 238 can be adjusted in the axial direction as well as in the circumferential direction. Thus, the coated area on the sheet 100 can be controlled in the width direction (perpendicular to the transport direction) as well.

The recovery/circulating unit 236 (similar to the recovery/circulating unit 36 of the foregoing embodiment) is configured to receive the foamed liquid produced by the second foamed liquid producing/transporting unit 232, and to transfer the foamed liquid toward the first foamed liquid producing/transporting unit 231 using a stirring/transport member, which is not shown in FIG. 4.

The foamed liquid supplied from the second foamed liquid producing/transporting unit 232 is applied to the circumferential surface of the first coating roller 238 as it rotates in the direction of the arrow. The foamed liquid is then transferred to the second coating roller 233 at an opposed position. A film thickness setting member 271 is disposed opposite the circumferential surface of the first coating roller 238 in order to make uniform the film thickness of the foamed liquid on the first coating roller 238. A first foamed liquid removing unit 272 is further disposed in order to remove the foamed liquid that remains attached to the first coating roller 238 after coating the second coating roller 233.

Figure 7:
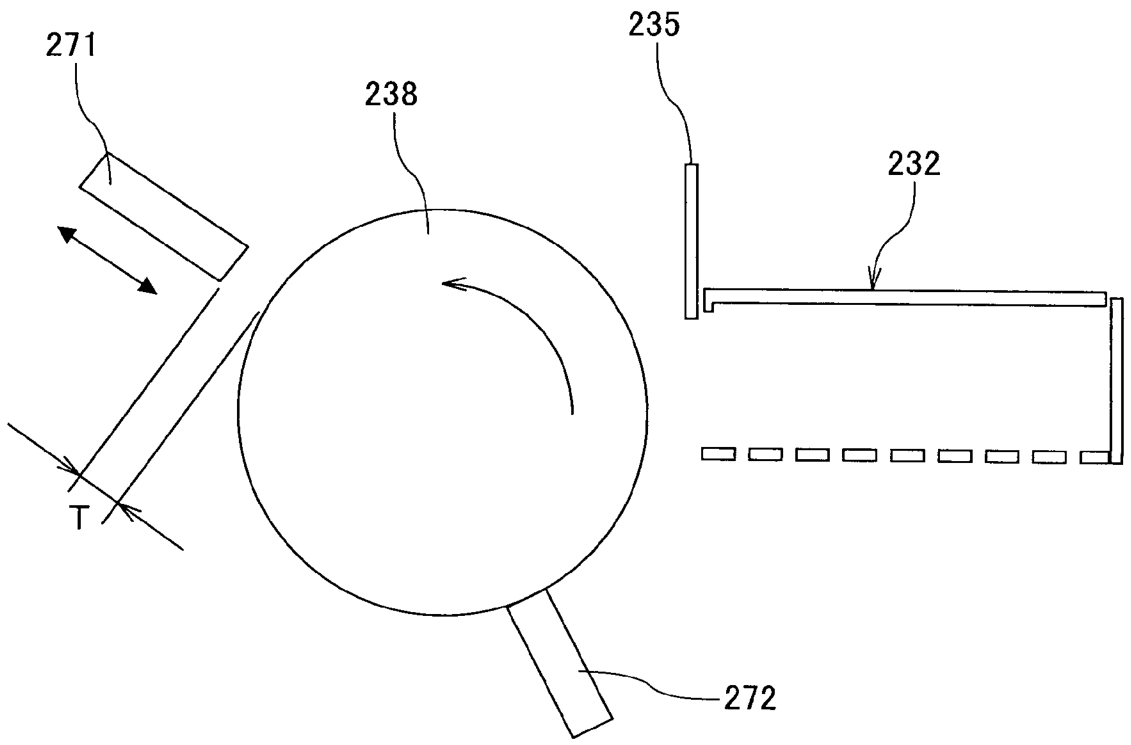
FIG. 7 shows how a film thickness setting member is disposed relative to a coating roller to control the thickness of the film on the coating roller.

The film thickness setting member 271 is disposed in such a manner as to be movable in the directions of the arrows, as shown in FIG. 7. By controlling the distance of the film thickness setting member 271 from the first coating roller 238, the film thickness T can be adjusted as desired. The adjustment may be made by performing a predetermined operation on an operating/display unit of the image forming apparatus. Thus, the coated film thickness of the foamed liquid can be set as desired, so that various conditions of use can be accommodated.

As the second coating roller 233 rotates in the direction of the arrow, the foamed liquid is applied to its circumferential surface at the position directly opposite to the first coating roller 238. The second coating roller 233 then applies the foamed liquid with a uniform thickness onto the sheet 100. A second foamed liquid removing unit 273 is disposed opposite the circumferential surface of the second coating roller 233 in order to remove the foamed liquid that remains attached to the second coating roller 233 after the coating of the sheet 100.

Thus, the foamed liquid that has become unwanted after coating of the first coating roller 238 and the second coating roller 233 is removed by the first and the second foamed liquid removing units 272 and 273. In this way, the application of the foamed liquid onto areas other than the print area can be prevented reliably in the subsequent steps or units, so that the application of foamed liquid with an improved film thickness stability can be realized.

The second coating roller 233 may be equipped with a second heating unit for quickening the drying of the foamed liquid that remains on its circumferential surface after coating the sheet 100, and the drying of the foamed liquid on the sheet 100 immediately after coating. The second heating unit may be controlled in accordance with a certain timing in order to minimize power consumption.

At least one of the transport roller 121 and the driven roller 122 may be equipped with a third heating unit for heating the sheet 100 or the foamed liquid applied thereon via the transport belt 102. The third heating unit may be controlled in accordance with an optimal timing in order to quicken the drying of the foamed liquid that remains on the film thickness setting unit after coating the sheet 100 with the foamed liquid, the drying of the foamed liquid on the sheet 100 immediately after coating, and the drying of the printed droplets on the sheet 100, while minimizing power consumption.

Figure 8:
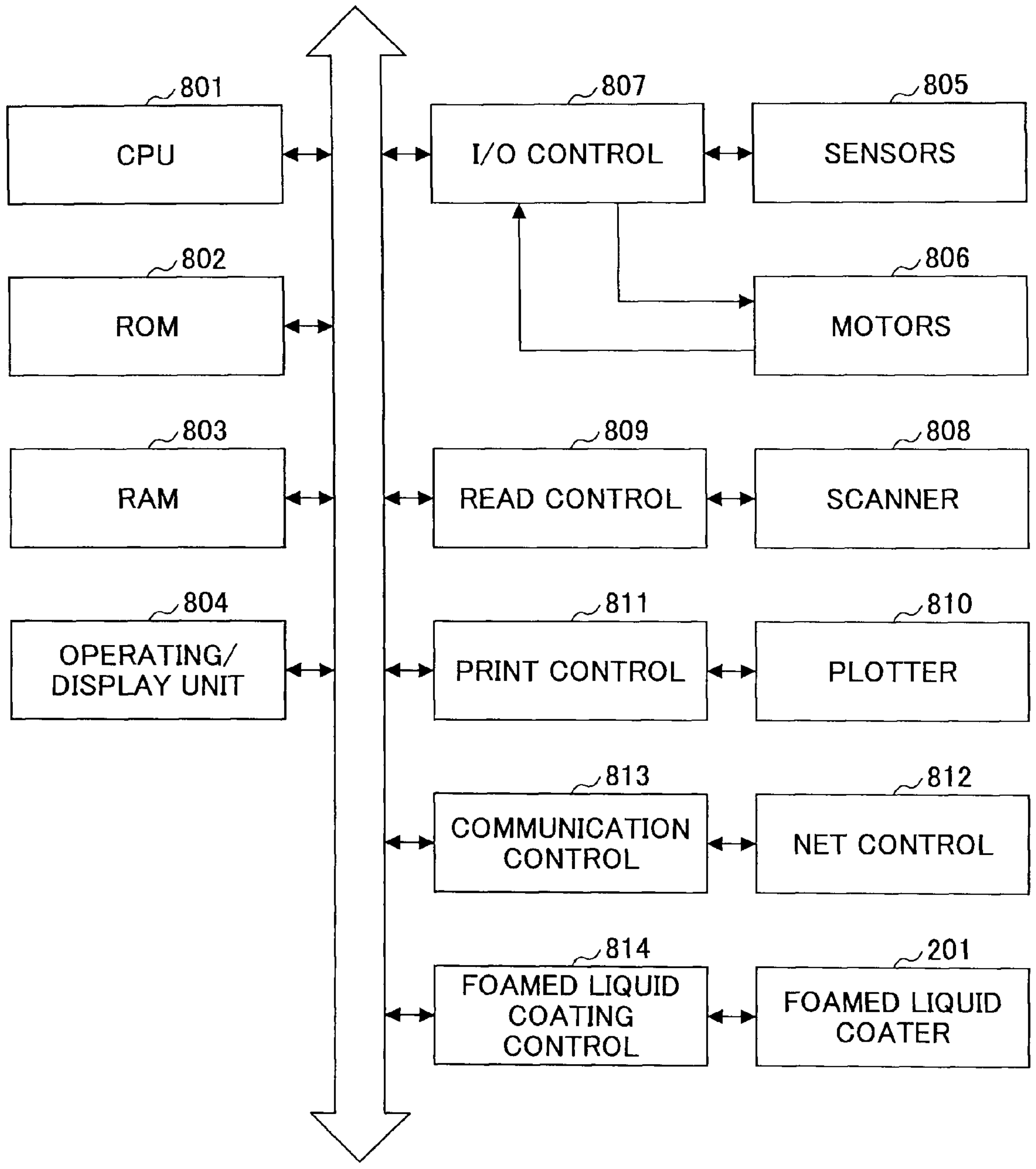
FIG. 8 shows a block diagram of a control unit of the image forming apparatus according to the embodiment shown in FIG. 4.

In the following, a control unit of the image forming apparatus is described with reference to a block diagram shown in FIG. 8.

The control unit includes a central processing unit (CPU) 801 for performing a system control of the image forming apparatus; a read-only memory (ROM) 802 in which data for programs executed by the CPU 801 may be stored; a random access memory (RAM) 803 used as a working area; an operating/display unit 804 on which an operator can make various settings; various sensors 805 for paper size detection, jamming detection, etc.; various motors 806; an input/output (I/O) control unit 807 for controlling the input and output of control signals to and from the various sensors 805 and the various motors 806; a reading control unit 809 for controlling the image reading device (scanner) 808; a print control unit 811 for controlling a plotter unit (print mechanism unit) 810; a communications control unit 813 for controlling various facsimile communications including the control of a net control device 812 that controls the interface (I/F) with telephone lines; and a foamed liquid application control unit 814 for controlling the foamed liquid coating apparatus 201.

The various sensors 805 include a temperature/humidity sensor for detecting ambient conditions, and a liquid end sensor for detecting whether the foamable liquid 200 is present in the container 210.

Hereafter, a printing process in the image forming apparatus is described with reference to flowcharts shown in FIGS. 9 through 12.

Figure 9:
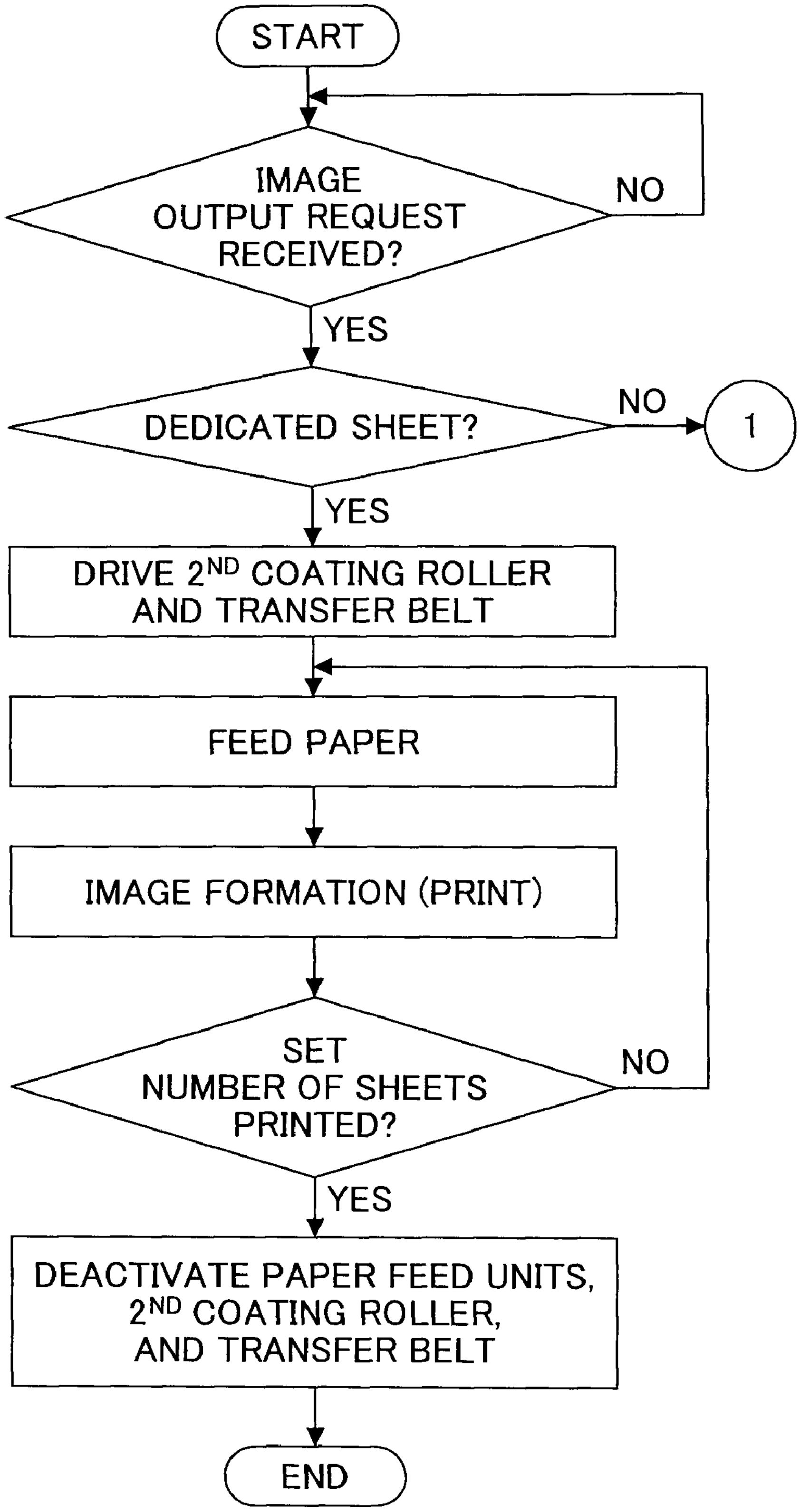
FIG. 9 shows a flowchart of a print process performed by the image forming apparatus.

Reference is made to FIG. 9. Upon reception of an image output request, it is determined whether the sheet 100 is a predetermined dedicated sheet. If it is a dedicated sheet, the second coating roller 233 is rotated and the transport roller 121 is driven to move the transport belt 102 in a circular path. At a predetermined time, feeding of the sheet 100 from the paper feed tray 103 is started. The sheet 100 is transported on the transport belt 102 to an image forming position where the recording head unit 101 discharges ink droplets onto the sheet 100 to form a required image thereon. After a required number of sheets are printed, the routine ends by ceasing the operation of feeding units such as the transport roller pair 132, the second coating roller 233, and the transport roller 121. The "dedicated sheet" above refers to an inkjet recording sheet having a coating layer or the like formed thereon.

Figure 10:
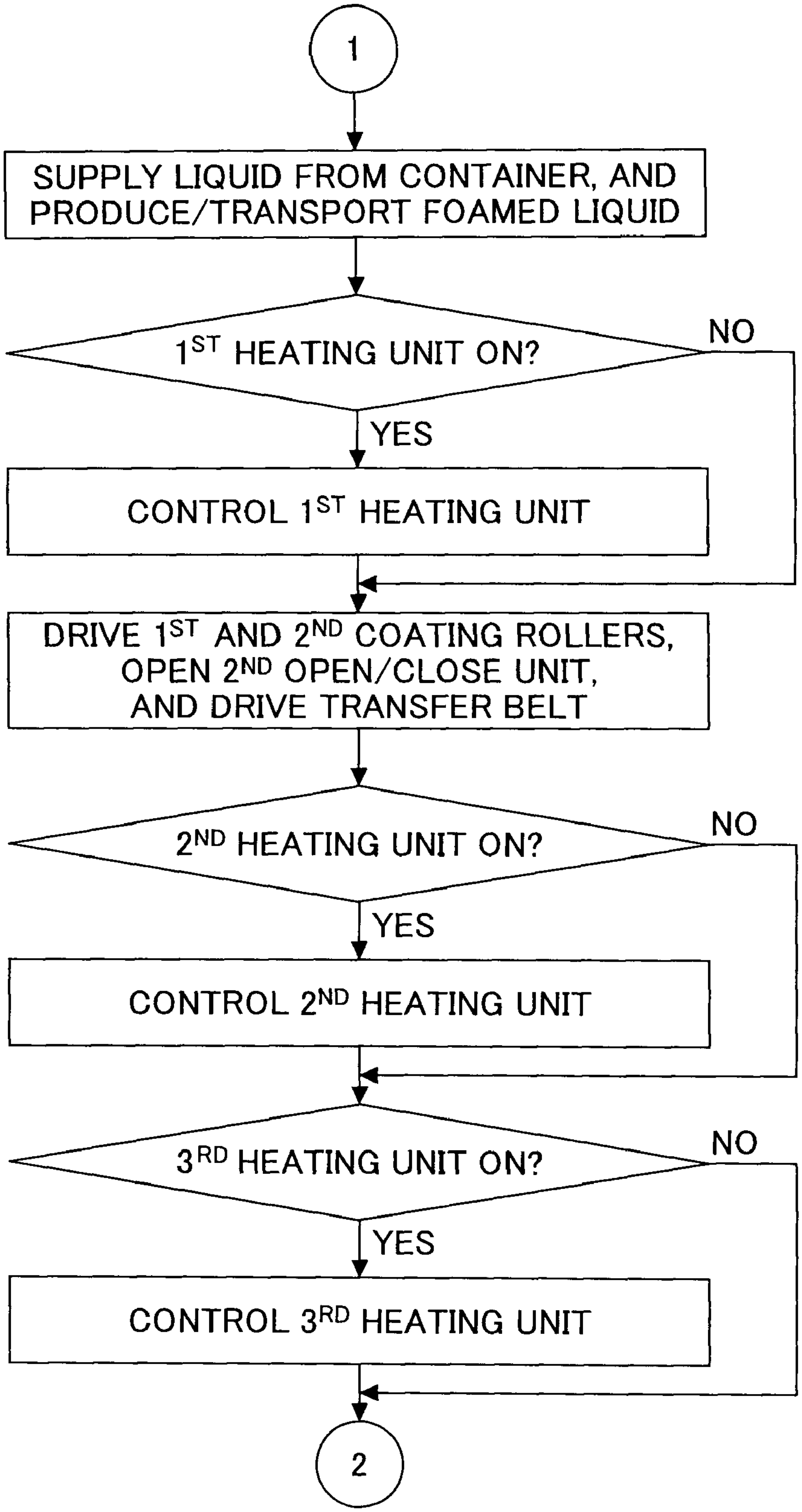
FIG. 10 shows a part of the flowchart of FIG. 9.

When the sheet 100 is not a dedicated sheet, the pump 263 is activated to supply the liquid 200 from the container 210 to the first foamed liquid producing/transporting unit 231 of the foamed liquid coating apparatus 201, as shown in FIG. 10. Then, the first and the second foamed liquid producing/transporting units 231 and 232 as well as the stirring/transport member in the recovery/circulating unit 236 are driven, and the first open/close unit 234 is also opened as described above, thereby starting the production of foamed liquid with a predetermined foam size.

Thereafter, it is determined whether the setting of the first heating unit 265 is on. If it is on, the first heating unit 265 is controlled in a predetermined manner in order to adjust the temperature of the second foamed liquid producing/transporting unit 232 to a predetermined value.

By turning on the first heating unit 265 for heating the foamed liquid simultaneously with the turning on of the apparatus, the need for the user to turn on the heating unit 265 can be eliminated when it is desired to supply the foamed liquid to the coater unit stably without being influenced by the surrounding environment during the use of the image forming apparatus. Alternatively, by turning on the heating unit 265 for heating the foamed liquid at a predetermined time, a stable-quality foamed liquid can be supplied to the coater unit without power consumption loss and without being influenced by the ambient temperature.

In the next step, the second open/close unit 235 is opened at a predetermined time such that the sheet 100 can be coated with the foamed liquid uniformly. Simultaneously, the first coating roller 238, the second coating roller 233, and the transport belt 102 are driven to apply the foamed liquid from the second foamed liquid producing/transporting unit 232 to the first coating roller 238. The film thickness of the foamed liquid applied on the first coating roller 238 is controlled by the film thickness setting member 271, so that the foamed liquid with a controlled film thickness can be applied to the second coating roller 233.

It is then determined whether the setting of the second heating unit (not shown) for the second coating roller 238 is on. If on, the second heating unit is controlled so that the second coating roller 238 reaches a temperature in accordance with a value detected by a temperature/humidity sensor (not shown).

It is further determined whether the setting of the third heating unit (not shown) is on. If on, the third heating unit is controlled so that the transport belt 102 has a temperature in accordance with a value detected by the temperature/humidity sensor (not shown).

By thus controlling the second and the third heating units, it becomes possible to quicken the drying of the foamed liquid that remains on the second coating roller 233 after coating of the sheet 100, the drying of the foamed liquid on the sheet 100 immediately after coating, and the drying of the ink droplets on the sheet 100, while minimizing power consumption. In other words, by controlling the second heating unit with which the film thickness setting unit 271 is equipped at a predetermined time, it becomes possible to quicken the drying of the foamed liquid that remains on the film thickness setting unit 271 after coating the recording medium, and the drying of the foamed liquid on the recording medium immediately after coating, while minimizing power consumption. Further, by controlling the third heating unit with which the transport unit for transporting the recording medium is equipped at a predetermined time, it becomes possible to quicken the drying of the foamed liquid that remains on the film thickness setting unit 271 after coating the recording medium, and the drying of the foamed liquid on the recording medium immediately after coating, while power consumption is minimized. The drying of the ink droplets on the recording medium is also quickened by the heating of the medium. Furthermore, by controlling the heating units in accordance with the ambient conditions, i.e., on the basis of ambient temperature and humidity information, the drying times can be reduced and power consumption can be minimized in a manner more adapted to the surrounding environment.

Figure 11:
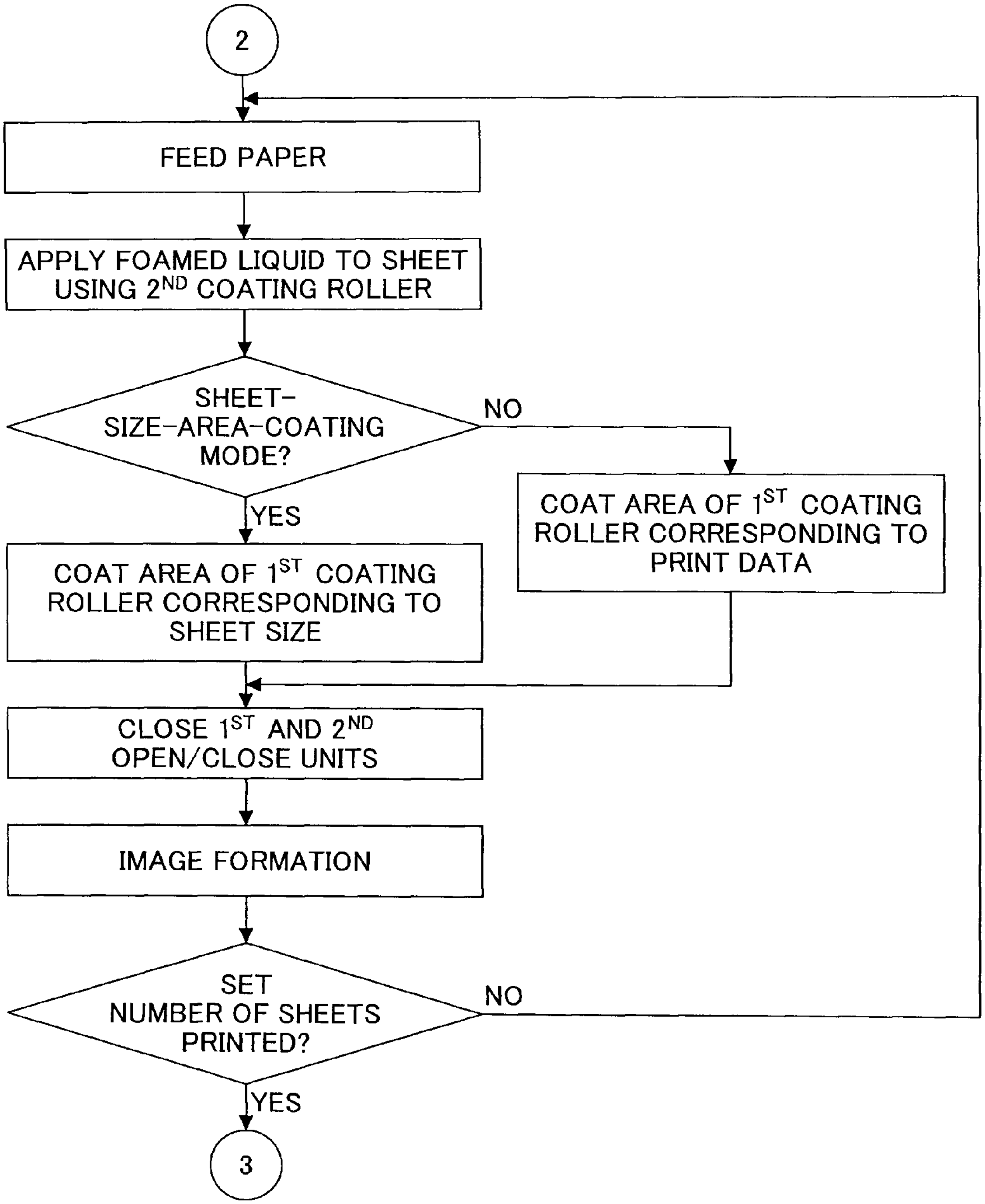
FIG. 11 shows another part of the flowchart of FIG. 9.
Figure 12:
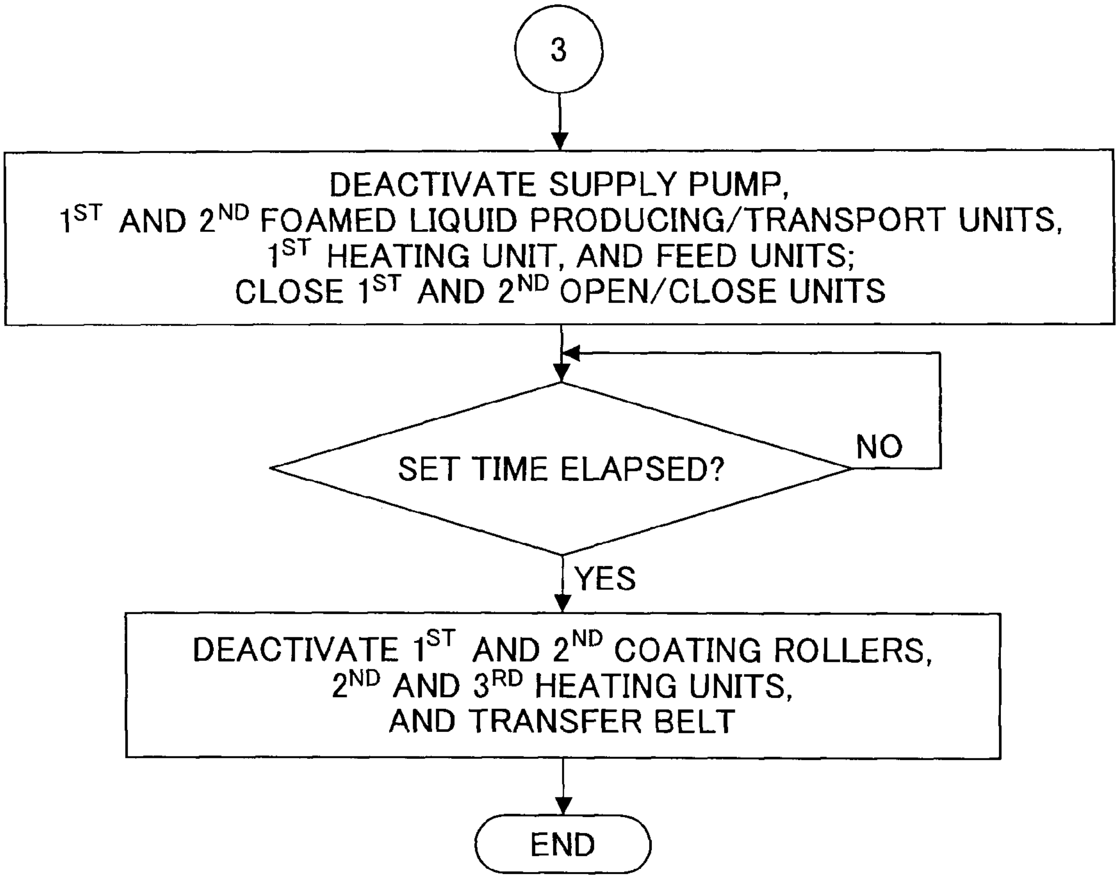
FIG. 12 shows another part of the flowchart of FIG. 9.

Thereafter, as shown in FIG. 11, the sheet 100 is transported on the transport belt 102 in accordance with a predetermined timing, and the application of the foamed liquid by the second coating roller 233 is initiated. Specifically, it is determined whether the application mode is a "sheet-size-area-coating" mode in which the foamed liquid is applied to an area corresponding to the sheet size. If so, the second open/close unit 235 is opened and closed so that the foamed liquid is applied to the first coating roller 238 in an area corresponding to the size of the sheet 100.

If the mode is not the sheet-size-area-coating mode, it is determined whether the mode is a "print-data-area-coating" mode, in which the foamed liquid is applied to an area corresponding to the print data. When the mode is the print-data-area-coating mode, the second open/close unit 235 is opened and closed so that the foamed liquid is only applied to an area of the first coating roller 238 that corresponds to the print data. Then, the first and the second open/close units 234 and 235 are closed.

Thus, because the first and the second open/close units 234 and 235 are operated at predetermined times in response to an image output request, a particularly fine foamed liquid can be supplied to the coater unit efficiently and stably without being influenced by the ambient temperature.

In this way, a predetermined area of the sheet 100 can be coated with the foamed liquid. By thus controlling the area of the recording medium that is coated with the foamed liquid, staining of the sheet by the foamed liquid and a waste of the foamed liquid can be prevented. Because the foamed liquid is only applied to an area of the recording medium corresponding to its size, the need for the operator to designate a foamed liquid coated area depending on each sheet size can be eliminated, and a high-quality image output with no blurring, strike-through, or density irregularities can be obtained. Alternatively, by applying the foamed liquid only to an area corresponding to the print data alone, the foamed liquid can be applied with less waste and the amount of a fixing agent used can be saved.

The sheet 100 coated with the foamed liquid in a required area is further transported by the transport belt 102, and then ink droplets are discharged by the recording head unit 101 onto the sheet 100 to form an image thereon. After ink droplets are discharged by the recording head unit 101 onto the sheet 100 and a required image is formed thereon, the sheet 100 is discharged.

The foamed liquid applying operation is continued until a required number of sheets 100 to be printed is reached. Upon reaching the required number of sheets, the routine proceeds to FIG. 12 where the liquid supply pump 263, the first foamed liquid producing/transporting unit 231, the second foamed liquid producing/transporting unit 232, the first heating unit 265, and the feeding units are deactivated, and the first and the second open/close units 234 and 235 are closed.

After the passage of a predetermined duration of time, i.e., a sufficient time that the foamed liquid can be fully removed from the first and the second coating rollers 238 and 233 by the first and the second foamed liquid removing units 272 and 273, respectively, the first and the second coating rollers 238 and 233, the second and the third heating units, and the transport belt 102 are deactivated, whereby the foamed liquid coating process ends.

By thus coating the surface of the sheet 100 with the foamed liquid, an improved coating uniformity and an enhanced fast-drying property can be achieved, and a high quality image output having no blurring, strike-through, or density irregularities can be obtained.

Figure 13:
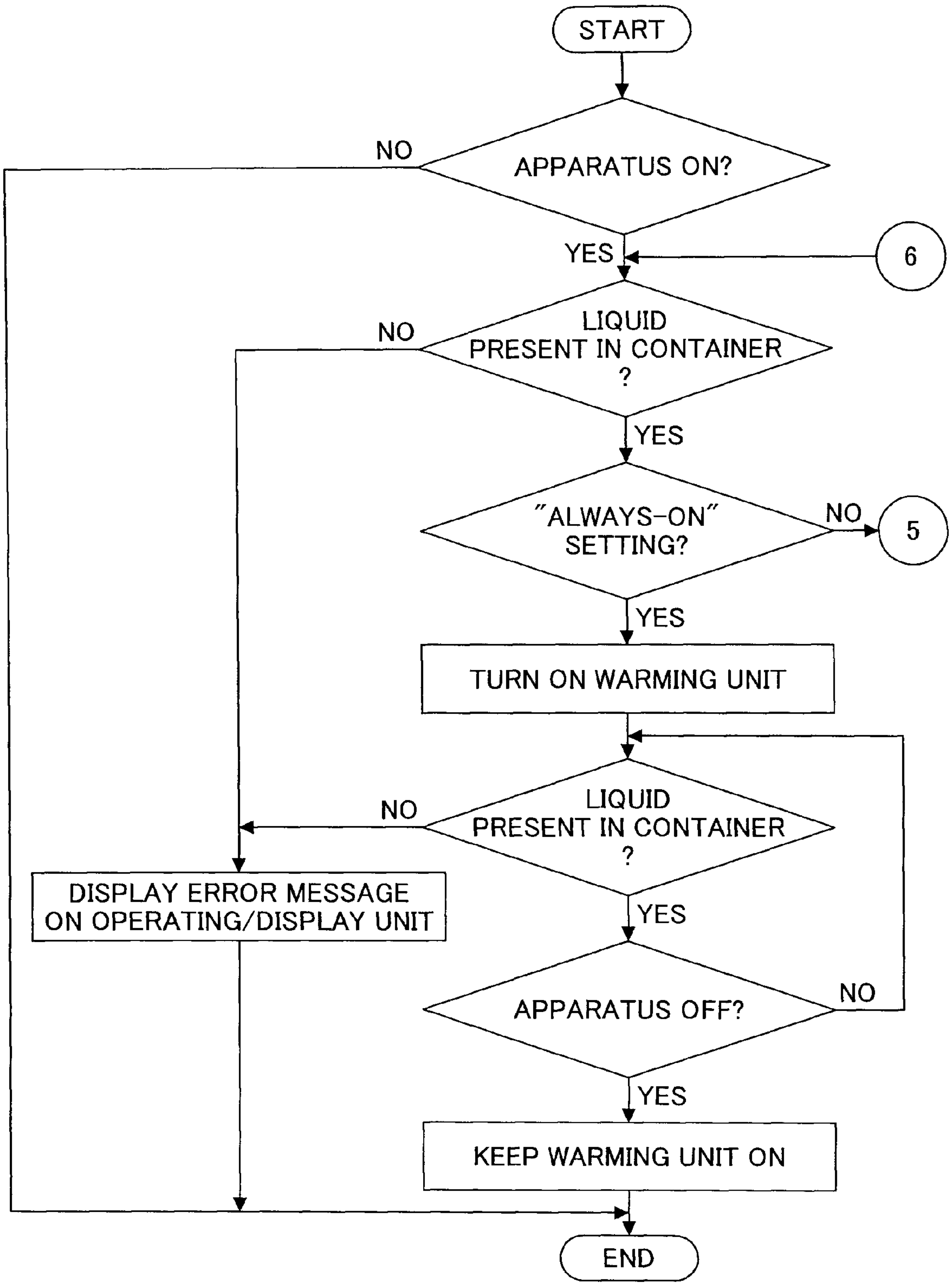
FIG. 13 shows a flowchart of a temperature-maintaining control process.

In the following, a liquid-temperature maintaining control is described with reference to flowcharts shown in FIGS. 13 and 14. First, reference is made to FIG. 13. As the image forming apparatus is turned on, it is determined whether the liquid 200 is present in the container 210 based on the result of detection by, the liquid end sensor (not shown). When the liquid 200 is not present in the container 210, an error message is displayed on the operating/display unit 804. When the liquid 200 is in the container 210, a warming unit on-timing setting is checked to determine whether it is an "always-on" setting. If the setting is the always-on setting, the warming unit 261 is turned on, and its on-state is maintained even when the image forming apparatus is turned off.

Figure 14:
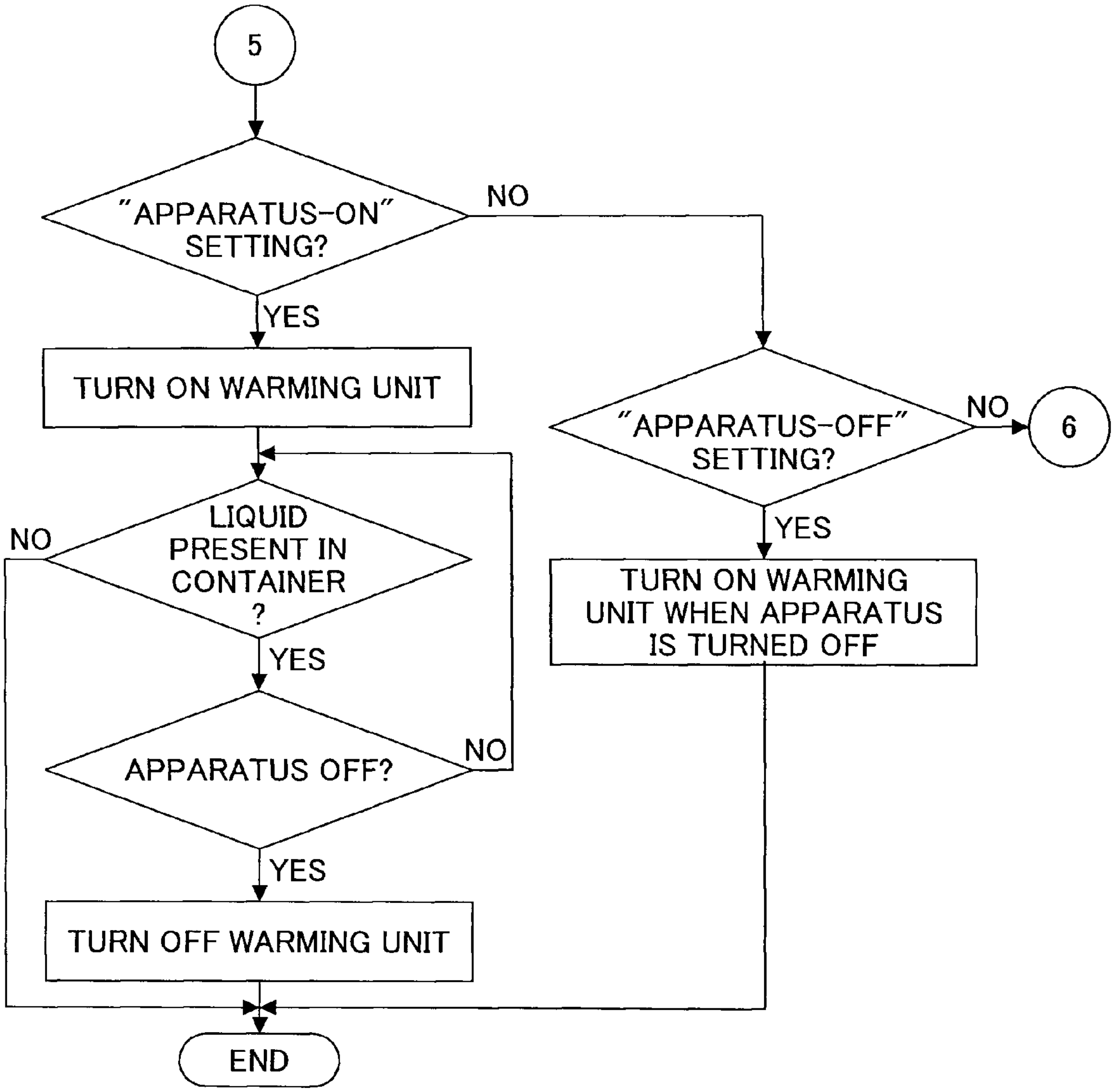
FIG. 14 shows a part of the flowchart of FIG. 13.

When the warming unit on-timing setting is not the always-on setting, it is determined whether it is an "apparatus-on" setting, as shown in FIG. 14. When the setting is the apparatus-on setting, the warming unit 261 is turned on upon turning-on of the image forming apparatus. When the image forming apparatus is turned off, the warming unit 261 is also turned off. By thus turning-on the warming unit 261 simultaneously with the turning on of the apparatus, the foamable liquid 200 can be supplied to the foamed liquid producing units stably and without being influenced by the surrounding environment during the use of the image forming apparatus, and the need for the user to turn on the warming unit 261 can be eliminated.

If the warming unit on-timing setting is not the apparatus-on setting, either, it is determined whether the warming unit timing setting is an "apparatus-off" setting. In the apparatus-off setting, the warming unit 261 remains off until the image forming apparatus is turned off. Such a setting, in which the warming unit 261 is turned on upon turning-off of the image forming apparatus, is particularly suitable in cold districts, where it may be desired to keep the warming unit 261 off during the operation of the main apparatus in order to minimize power consumption. The need for the user to turn on the warming unit 261 can also be eliminated.

When the image forming apparatus is on, the result of detection made by the liquid end sensor is checked periodically. Upon detection of the absence of the liquid, an error message is displayed on the operating/display unit 804.

By thus allowing the operator to select the timing of turning on the warming unit 261 for keeping warm the container 210 of the foamable liquid 200, i.e., whether the warming unit 261 is to be turned on upon turning on of the image forming apparatus, upon turning off of the apparatus, or whether it should remain on at all times, the need for the operator to turn on the warming unit 261 can be eliminated in any environment.

Figure 15:
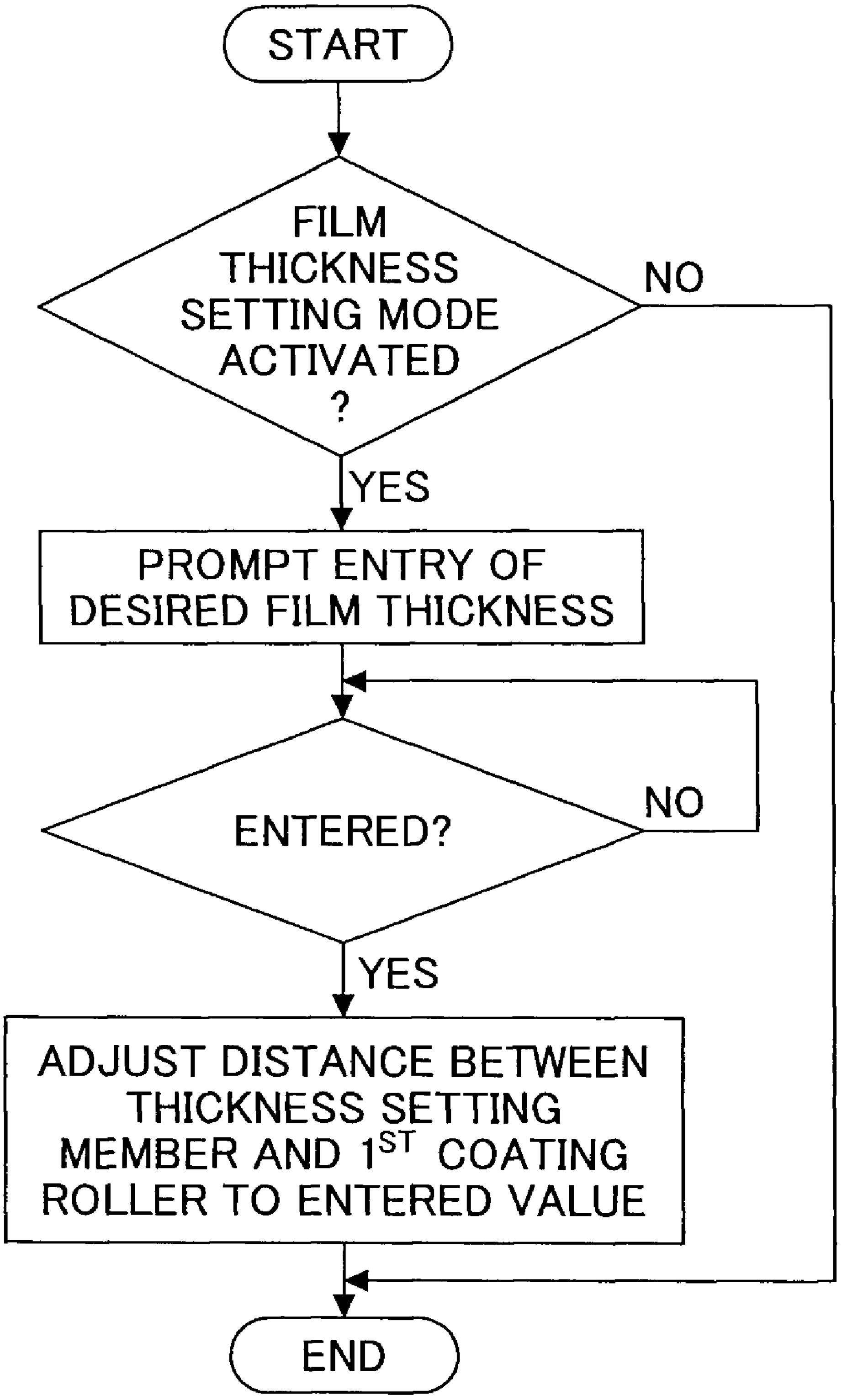
FIG. 15 shows another part of the flowchart of FIG. 13.

In the following, a film thickness setting process is described with reference to a flowchart shown in FIG. 15.

When a predetermined operation is performed on the operating/display unit 804, a foamed liquid film thickness setting mode is activated. The operator is then prompted to enter a desired film thickness. Upon entry of the film thickness from the user, the distance between the first coating roller 238 and the film thickness setting member 271 (see FIG. 7) is adjusted to the entered value.

Other settings, such as the individual heating unit setting, the warming unit setting, and settings concerning the on/off of various functions, can be entered on the operating/display unit 804 by performing predetermined operations. By thus allowing the operator to enter and change various timings, parameters such as the film thickness, and function on/off settings via the operating/display unit 804 by performing predetermined operations, the image forming apparatus can be adjusted to output an optimum image with minimum power consumption in various use conditions.

Thus, the foamed liquid coating apparatus 201 is capable of efficiently producing a fine foamed liquid and applying it onto a recording medium using its various components, including the container holding a foamable liquid; the first foam producing unit for producing a foamed liquid with a foam size larger than a required foam size from the liquid supplied from the container; the second foam producing unit for producing a foamed liquid with the required foam size from the foamed liquid produced by the first foam producing unit; and the coater unit for applying the foamed liquid produced by the second foam producing unit onto a recording medium.

The recovery unit, which collects the foamed liquid that need not be supplied to the coater unit, ensures that a new and fine foamed liquid is applied at all times. By circulating the collected foamed liquid back into the first foam producing unit, the foamed liquid can be utilized without waste. The first open/close unit provided between the first foam producing unit and the second foam producing unit allows or blocks the movement of the foamed liquid, whereby the mixing of foamed liquids with different foam sizes can be prevented. The second open/close unit provided between the second foam producing unit and the coater unit enables the foamed liquid to be transferred to the coater unit without waste. By configuring the open/close units such that the area of passage of foamed liquid can be varied, the foamed liquid can be applied even more efficiently.

In the image forming apparatus according to the foregoing embodiment, the foamed liquid coating apparatus 201 applies the foamed liquid 200 onto a sheet on which an image is yet to be formed. Alternatively, the foamed liquid coating apparatus 201 may be disposed downstream of the recording head unit 101 so that the foamed liquid can be applied onto a sheet on which an image has been formed.

Although this invention has been described in detail with reference to certain embodiments, variations and modifications exist within the scope and spirit of the invention as described and defined in the following claims.

The present application is based on the Japanese Priority Application No. 2007-178698 filed Jul. 6, 2007, the entire contents of which are hereby incorporated by reference.

The invention claimed is:

1. An image forming apparatus comprising:

a recording head configured to discharge a droplet of a fluid onto a recording medium in order to form an image thereon;

a foamed liquid coating unit including a coating roller and configured to apply a foamed liquid onto the recording medium; and a film thickness setting unit separated, via a gap, from the coating roller and configured to adjust a film thickness of the foamed liquid that is on the circumferential surface of the coating roller and is to be applied by the foamed liquid coating unit to the recording medium before the recording head discharges the droplet of the fluid onto the recording medium, wherein the film thickness setting unit is arranged downstream from a foamed liquid supply point and before a foamed liquid transfer point of the coating roller, and wherein the recording head discharges the droplet of the fluid onto the recording medium after the foamed liquid is applied by the foamed liquid coating unit onto the recording medium.

2. The image forming apparatus according to claim 1, wherein the fluid is a recording fluid having a colorant, and wherein the recording fluid reacts with the foamed liquid.

3. The image forming apparatus according to claim 1, wherein the foamed liquid coating unit includes:

a container for holding a liquid that can be foamed;

a first foam producing unit configured to produce a foamed liquid having a foam size greater than a required foam size from the liquid supplied from the container;

a second foam producing unit configured to produce a foamed liquid having the required foam size from the foamed liquid produced by the first foam producing unit; and a coater unit configured to apply the foamed liquid produced by the second foam producing unit onto the recording medium.

4. The image forming apparatus according to claim 3, including a recovery unit configured to recover the foamed liquid that need not be fed to the coater unit.

5. The image forming apparatus according to claim 4, including a circulating unit configured to circulate the recovered foamed liquid back into the first foam producing unit.

6. The image forming apparatus according to claim 3, including a first open/close unit disposed between the first foam producing unit and the second foam producing unit and configured to allow or block the movement of the foamed liquid.

7. The image forming apparatus according to claim 6, including a second open/close unit disposed between the second foam producing unit and the coater unit and configured to allow or block the movement of the foamed liquid.

8. The image forming apparatus according to claim 7, wherein the second open/close unit is capable of varying the area of passage of the foamed liquid.

9. The image forming apparatus according to claim 3, including a warming unit configured to warm the container.

10. The image forming apparatus according to claim 3, including a heating unit configured to heat the foamed liquid in the first foam producing unit and the second foam producing unit.

11. The image forming apparatus according to claim 10, wherein the heating unit is controlled on the basis of a result of detection of an ambient condition.

12. The image forming apparatus according to claim 2, wherein the recording medium includes a sheet, and the foamed liquid includes a modifier configured to modify a surface of the recording medium.

13. The image forming apparatus according to claim 12, wherein the modifier includes a material which, when applied onto the sheet before the recording fluid is discharged by the recording head, facilitates the permeation of the moisture of the recording fluid into the sheet and thickens color components.

14. The image forming apparatus according to claim 1, further comprising:

a transport unit configured to transport the recording medium in a transport direction along a transport path, wherein the foamed liquid coating unit that applies the foamed liquid onto the recording medium is upstream, in the transport direction, of the recording head that discharge the droplet of the fluid onto the recording medium.

15. An image forming method for an image forming apparatus that includes a recording head unit, a film thickness setting unit and a foamed liquid coating unit including a coating roller, the image forming method comprising:

(a) applying a foamed liquid onto a circumferential surface of the coating roller of the foamed liquid coating unit;

(b) adjusting, by the film thickness setting unit which is separated, via a gap, from the coating roller, a film thickness of the foamed liquid that is on the circumferential surface of the coating roller, wherein the film thickness setting unit is arranged downstream from a foamed liquid supply point and before a foamed liquid transfer point of the coating roller;

(c) applying, by the foamed liquid coating unit of the image forming apparatus, the foamed liquid onto a recording medium; and (d) discharging, by a recording head unit of the image forming apparatus, a droplet of a recording fluid onto the recording medium after the foamed liquid is applied in (c) onto the recording medium.

16. The image forming apparatus according to claim 1, wherein the foamed liquid coating unit further includes a foamed liquid transporting unit configured to transport the foamed liquid onto circumferential surface of the coating roller, and the film thickness setting unit is movable to adjust the film thickness of the foamed liquid that is on the circumferential surface of the coating roller.

* * * * *